US012678943B2

(12) United States Patent
Murphy et al.

(10) Patent No.: US 12,678,943 B2
(45) Date of Patent: *Jul. 14, 2026

(54) AUTONOMOUS OBJECT LEARNING BY ROBOTS TRIGGERED BY REMOTE OPERATORS

(71) Applicant: GDM Holding LLC, Mountain View, CA (US)

(72) Inventors: Gearoid Murphy, San Jose, CA (US); Patrick Leger, Belmont, CA (US)

(73) Assignee: Google LLC, Mountain View, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 18/158,569

(22) Filed: Jan. 24, 2023

(65) Prior Publication Data

US 2023/0158668 A1 May 25, 2023

Related U.S. Application Data

(63) Continuation of application No. 16/716,874, filed on Dec. 17, 2019, now Pat. No. 11,584,004.

(51) Int. Cl.
| | |
|---|---|
| *B25J 9/16* | (2006.01) |
| *B25J 13/08* | (2006.01) |
| *B25J 15/00* | (2006.01) |
| *B25J 19/02* | (2006.01) |
| *G05B 13/02* | (2006.01) |

(52) U.S. Cl.
CPC ............. *B25J 9/163* (2013.01); *B25J 9/1697* (2013.01); *B25J 13/08* (2013.01); *B25J 15/0052* (2013.01);
(Continued)

(58) Field of Classification Search
CPC . B25J 9/163; B25J 9/1697; B25J 13/08; B25J 15/0052; B25J 19/023; B25J 9/162;
(Continued)

(56) References Cited

U.S. PATENT DOCUMENTS

| | | | |
|---|---|---|---|
| 4,831,549 A | 5/1989 | Red et al. | |
| 5,784,282 A | 7/1998 | Abitbol et al. | |
| | (Continued) | | |

FOREIGN PATENT DOCUMENTS

| | | | | |
|---|---|---|---|---|
| CN | 114728417 A | * | 7/2022 | ........... B25J 9/1689 |
| JP | 2003346152 | | 12/2003 | |

OTHER PUBLICATIONS

Viereck et al., "Learning a visuomotor controller for real world robotic grasping using simulated depth images," College of Computer and Information Science, Northeastern University, 2017, 7 pagese.

*Primary Examiner* — Harry Y Oh

(74) *Attorney, Agent, or Firm* — McDonnell Boehnen Hulbert & Berghoff LLP

(57) ABSTRACT

A method includes receiving, by a control system of a robotic device, data about an object in an environment from a remote computing device, where the data comprises at least location data and identifier data. The method further includes, based on the location data, causing at least one appendage of the robotic device to move through a predetermined learning motion path. The method additionally includes, while the at least one appendage moves through the predetermined learning motion path, causing one or more visual sensors to capture a plurality of images for potential association with the identifier data. The method further includes sending, to the remote computing device, the plurality of captured images to be displayed on a display interface of the remote computing device.

20 Claims, 11 Drawing Sheets

(52) U.S. Cl.
     CPC ........ *B25J 19/023* (2013.01); *G05B 13/0265*
                                                       (2013.01)

(58) Field of Classification Search
     CPC .......... B25J 9/16; B25J 9/1664; B25J 9/1689;
               G05B 13/0265; G05B 2219/40003; G05B
                                                 2219/40452
     See application file for complete search history.

(56)                      References Cited

U.S. PATENT DOCUMENTS

| | | | |
|---|---|---|---|
| 7,539,563 | B2 | 5/2009 | Yang et al. |
| 8,781,629 | B2 | 7/2014 | Ota |
| 9,092,698 | B2 | 7/2015 | Buehler et al. |
| 9,669,544 | B2 | 6/2017 | Buehler et al. |
| 10,360,531 | B1 * | 7/2019 | Stallman .............. G06Q 10/087 |
| 2010/0092032 | A1 * | 4/2010 | Boca ..................... B25J 9/1697 |
| | | | 348/222.1 |
| 2012/0053728 | A1 | 3/2012 | Theodorus et al. |
| 2013/0151007 | A1 * | 6/2013 | Valpola ................... B25J 13/08 |
| | | | 901/9 |
| 2013/0343640 | A1 | 12/2013 | Buehler et al. |
| 2016/0039034 | A1 * | 2/2016 | Becker ................ B23K 9/0953 |
| | | | 219/136 |
| 2017/0136632 | A1 * | 5/2017 | Wagner .................... B07C 3/18 |
| 2018/0104816 | A1 * | 4/2018 | Tokuchi ................ B25J 9/1679 |
| 2020/0223069 | A1 * | 7/2020 | Tan ........................ B25J 9/1625 |
| 2021/0162600 | A1 * | 6/2021 | Clever ................... B25J 9/1605 |
| 2021/0272269 | A1 * | 9/2021 | Suzuki ................... G06F 3/167 |

* cited by examiner

900

910 Receive location and identifier data about an object in the environment from a remote computing device 920 Cause an appendage with a visual sensor to move through a predetermined learning motion path 930 Cause a visual sensor to capture a plurality of images 940 Send the plurality of captured images to the remote computing device

1000

1010 Receive location and identifier data about an object in the environment of a robotic device from a user interface 1020 Send location and identifier data about the object to the robotic device 1030 Receiving a plurality of images from the robotic device 1040 Display the plurality of images on the user interface

AUTONOMOUS OBJECT LEARNING BY ROBOTS TRIGGERED BY REMOTE OPERATORS

CROSS-REFERENCE TO RELATED DISCLOSURE

This application is a continuation of U.S. patent application Ser. No. 16/716,874, filed on Dec. 17, 2019, which is incorporated herein by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve an object identification training method for a robotic device. A robotic device may be equipped with a movable appendage with a visual sensor for capturing images of a target object. A robotic device may be equipped with a movable appendage with a gripper for moving a target object while a visual sensor captures images of the object as well or instead. A human operator may send, through a remote computing device, data about the target object to the robotic device to cause the object identification training method to commence and cause the robotic device to move an appendage through a predetermined learning motion path. The robotic device may capture images of the target object with one or more visual sensors while the appendage moves through the predetermined learning motion path. An appendage with one or more visual sensors may move through the predetermined learning motion path. An appendage with a gripper may be used to pick up a target object and move the object through the predetermined learning motion path while in view of one or more visual sensors as well or instead. The robotic device may send the captured images to the remote computing device to be displayed to the human operator. The human operator may verify images which contain the target object and send the verified images to the robotic device to train a machine learning model to use for future object recognition.

In an embodiment, a method includes receiving, by a control system of a robotic device, data about an object in an environment from a remote computing device, wherein the data comprises at least location data and identifier data. The method further includes, based on the location data, causing at least one appendage of the robotic device to move through a predetermined learning motion path. The method additionally includes, while the at least one appendage moves through the predetermined learning motion path, causing one or more visual sensors to capture a plurality of images for potential association with the identifier data. The method further includes sending, to the remote computing device, the plurality of captured images to be displayed on a display interface of the remote computing device.

In another embodiment, a robotic device includes at least one appendage, one or more visual sensors, and a control system. The control system may be configured to receive data about an object in an environment from a remote computing device, wherein the data comprises at least location data and identifier data. The control system may be further configured to, based on the location data, cause the at least one appendage of the robotic device to move through a predetermined learning motion path. The control system may also be configured to, while the at least one appendage moves through the predetermined learning motion path, cause the one or more visual sensors to capture a plurality of images for potential association with the identifier data. The control system may additionally be configured to send, to the remote computing device, the plurality of captured images to be displayed on a display interface of the remote computing device.

In a further embodiment, a non-transitory computer readable medium is provided which includes programming instructions executable by at least one processor to cause the at least one processor to perform functions. The functions include receiving, by a control system of a robotic device, data about an object in an environment from a remote computing device, wherein the data comprises at least location data and identifier data. The functions further include, based on the location data, causing at least one appendage of the robotic device to move through a predetermined learning motion path. The functions additionally include, while the at least one appendage moves through the predetermined learning motion path, causing one or more visual sensors to capture a plurality of images for potential association with the identifier data. The functions further include sending, to the remote computing device, the plurality of captured images to be displayed on a display interface of the remote computing device.

In another embodiment, a system is provided that includes means for receiving, by a control system of a robotic device, data about an object in an environment from a remote computing device, wherein the data comprises at least location data and identifier data. The system further includes means for, based on the location data, causing at least one appendage of the robotic device to move through a predetermined learning motion path. The system additionally includes means for, while the at least one appendage moves through the predetermined learning motion path, causing one or more visual sensors to capture a plurality of images for potential association with the identifier data. The system further includes means for sending, to the remote computing device, the plurality of captured images to be displayed on a display interface of the remote computing device.

In another embodiment, a method includes receiving, from a user interface, data about an object in an environment of a robotic device, wherein the data comprises at least location data and identifier data. The method further includes sending the data to the robotic device to cause at least one appendage of the robotic device to move through a predetermined learning motion path while capturing images. The method additionally includes, after sending the data to the robotic device, receiving a plurality of images captured by the robotic device. The method further includes displaying the plurality of images on the user interface.

In a further embodiment, a non-transitory computer readable medium is provided which includes programming instructions executable by at least one processor to cause the at least one processor to perform functions. The functions include receiving, from a user interface, data about an object in an environment of a robotic device, wherein the data comprises at least location data and identifier data. The functions further include sending the data to the robotic device to cause at least one appendage of the robotic device to move through a predetermined learning motion path while capturing images. The functions additionally include, after sending the data to the robotic device, receiving a plurality of images captured by the robotic device. The functions further include displaying the plurality of images on the user interface.

In another embodiment, a system is provided that includes means for receiving, from a user interface, data about an object in an environment of a robotic device, wherein the data comprises at least location data and identifier data. The system further includes means for sending the data to the robotic device to cause at least one appendage of the robotic device to move through a predetermined learning motion path while capturing images. The system additionally includes, after sending the data to the robotic device, receiving a plurality of images captured by the robotic device. The system further includes displaying the plurality of images on the user interface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
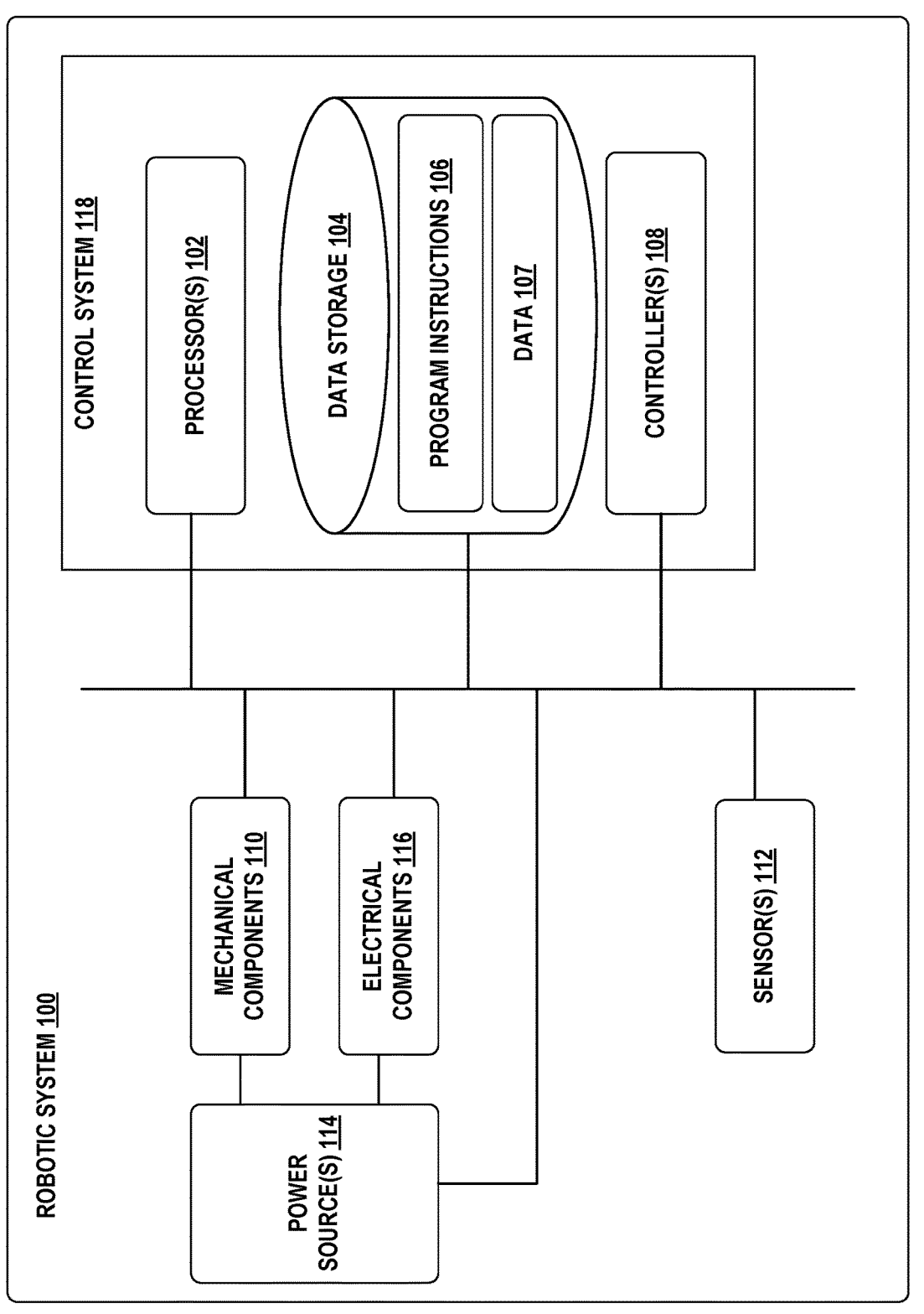
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of refer" to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

In order for a robot to be autonomous and independent from human control, the robot may learn to identify objects and surroundings for navigation and decision making. This is usually done by having the robot receive visual data through visual sensors such as cameras. The visual data is then processed by a processor and/or computing system connected to the robot. The processing can include object recognition, three-dimensional (3D) model generation, and/or environment mapping. From the results, the robot may navigate the surrounding environment and plan motion paths for controlling appendages to interact with objects. However, if the sensors or processing fail to correctly detect or identify an object or a part of the surroundings, it can lead to the robot having difficulty operating in the environment. For instance, the robot may collide with an obstacle or fail to properly grasp an object.

To improve robotic operation, machine learning models may be trained to process visual data. Common methods include edge detection and object recognition. However, these methods can sometimes fail. Edge detection may fail when objects of similar coloration overlap or an object is translucent. Object recognition may fail if an object is new (e.g. not in a known set of identification labels) or the edges of the object were not detected. It may be inefficient to allow a robot to repeatedly misidentify an object or attempt to grasp an object it cannot completely see.

The methods and embodiments described herein can be used to assist training a robot with visual sensors to identify objects that the robot could not identify with initial visual sensing. The disclosed methods may involve an interactive process between a robot and a human controller. The robots may have at least one movable appendage that has at least one visual sensor attached which can be leveraged to collect additional sensor data about an object. The robots may also have at least one movable appendage that has a gripper attached which can be used to pick up and move objects in view of a visual sensor as well or instead.

When a machine learning model is used to identify objects in visual data, along with predicted object identifications, the model may output a confidence score which is higher the more certain the model is that a predicted object identity is correct. A robot may fail to identify an object, or return an object identification with a low confidence score, based on the visual data it has collected from visual sensors. The robot could then alert a human operator of the failed identification. The human operator could then review the alert and failed identification and determine whether or not to have the robot start a further learning process to collect additional data. Having the human operator decide to start the process rather than having the robot start the process automatically may save time that could unnecessarily be spent by the robot.

If the human operator decides to trigger a further learning procedure, the operator can send identifier data of the object the robot could not successfully identify so that additional data can be associated with the correct object with high confidence. For instance, the identifier data may be an identifier label that is compatible with an object identification machine learning model of the robot's control system. The operator can also send location data of the unidentified object to the robot since the robot may not have successfully located the object. For instance, the location data could be a two-dimensional bounding box drawn around the object on a two-dimensional environment view of the robot recreated from the robot's visual sensors. As another example, the location data could be a point in three-dimensional space where the object resides in the physical world. The data may be created and sent from a computing device with a user interface. The user interface could allow the human operator to view the robot's two-dimensional environment view and supply the location data based on the view. The user interface could also give the human operator access to an object recognition library so that the operator may supply identifier data that is consistent with the library. This computing device could be in the same environment as the robot or the computing device may be in a remote location from the robot. The data may be sent through wireless and/or wired communication from the computing device to the robot's control system. Once the robot has received the data, it can initiate a learning motion procedure.

Based on the data the robot receives from the computing device, the robot can move at least one appendage with a visual sensor, such as the robot's head, into a starting position for a motion path of a learning motion procedure. This starting position could be where an appendage with a visual sensor is positioned such that an unidentified object is expected to be in the center of the field of view of the visual sensor based on the location data from the operator. In further examples, the starting position could also be where an appendage with a gripper picks up the object and holds it in view of a visual sensor. After reaching the starting position, the appendage may start moving in a motion path while collecting visual data. The motion path could be a predetermined motion path that is programmed ahead of run time into the robot control system. The motion path could also be selected from a plurality of various predetermined motion paths. The variation could depend on the size of the object, the location of the object, and/or the appendage that executes the motion path. If the robot has more than one movable appendage, multiple appendages could each execute a motion path to collect visual data. Additionally, if multiple appendages are executing a motion path, they could execute different motion paths.

Captured visual data may include pictures taken by cameras or other data collected by the robot's visual sensor(s). The visual data may be targeted to include the unidentified object, but not all of the data may contain the object since the robot may not have precise object location information. The motion path may lead the visual sensors to capture additional data that would help identify the object and its edges more accurately in the future. For example, the motion path may start with the object centered in the field of view of a visual sensor, then end with the object outside the field of view of the visual sensor. The additional captured images of the object could allow the edges of the object to be more accurately detected. In some examples, the motion path could be a spiral motion: starting with the object centered in view of a visual sensor, then moving in an expanding circular motion, collecting visual data until the motion path has been completed. Once the motion path has ended, the visual data may be associated or labeled with the object identification data from the operator.

In some examples, the collected visual data may be sent to a computing device, such as the computing device a human operator used to trigger the further learning process. Object identification data or labels may be used to add visual data to an object recognition library's training data. To increase the accuracy of the visual data that is associated with an identification label, a human operator may be provided with a user interface on a computing device that allows the operator to verify that image data contains the object before it is added to the training data. For example, if a robot used cameras to take pictures of an object while executing the motion path, then sent the images, labeled with the identification data, to a remote computer with a user interface, a human operator could review the images and confirm that each image contains the object and/or remove the images that do not. The visual data added to the object recognition library's training data could then be used to train the object recognition methods of the robot control system or other visual sensors for future object recognition. In this manner, the training data generated with the help of a human operator may improve a robot's automatic recognition of similar objects in the future.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Control system 118 may be configured to use one or more machine learning models. A machine learning model is a software component trained to generate output relevant to robotic operation based on input data such as image data of the environment. As an example, a machine learning model may be trained to carry out object recognition analysis, such as identifying types of objects in an image of an environment of the robot. In some examples, the machine learning model may be an artificial neural network (ANN) including one or more layers between at least one input node and at least one output node. Other types of machine learning models may also be used in the context of this disclosure.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
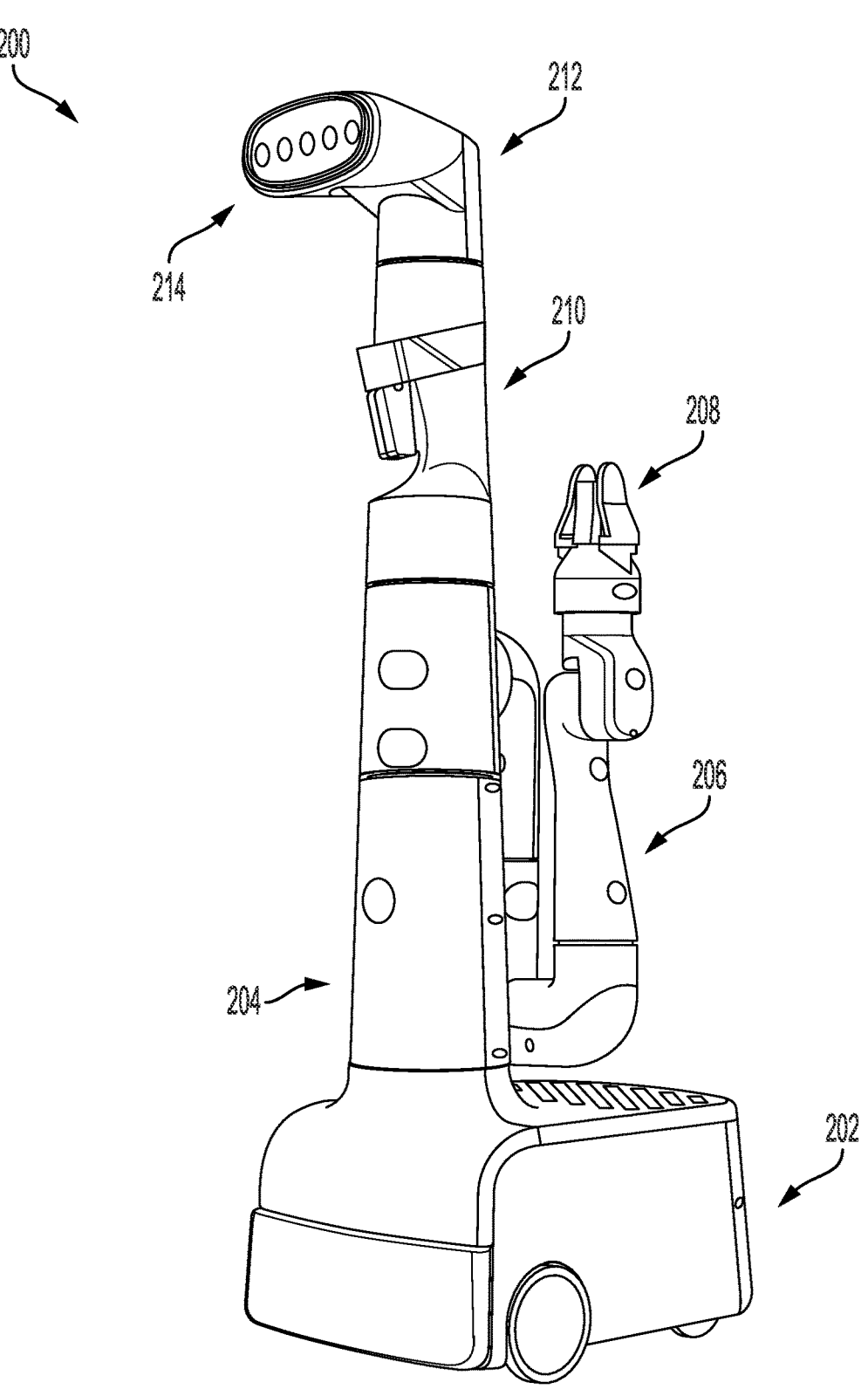
FIG. 2 illustrates a mobile robot, in accordance with example embodiments.
Figure 3:
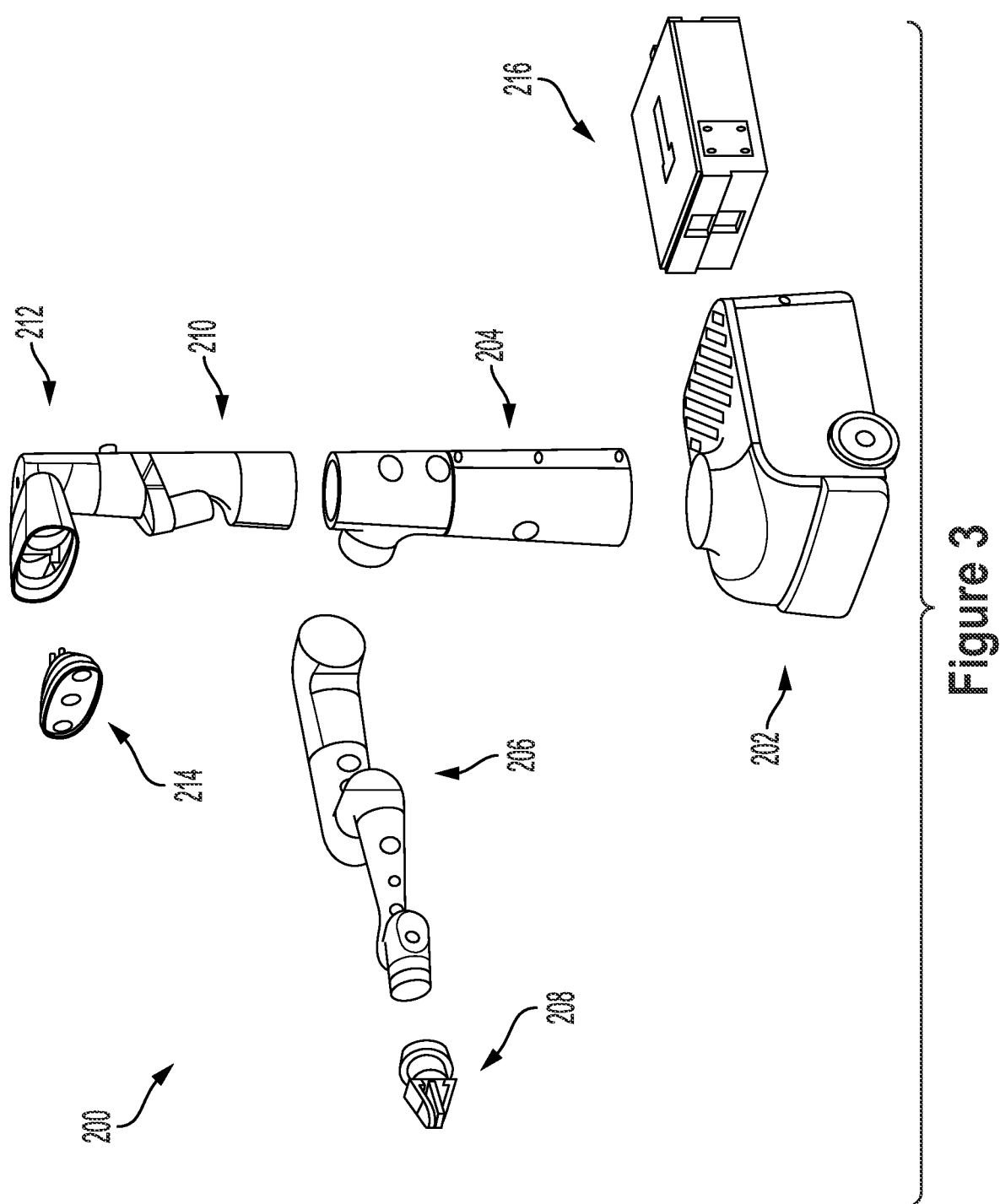
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
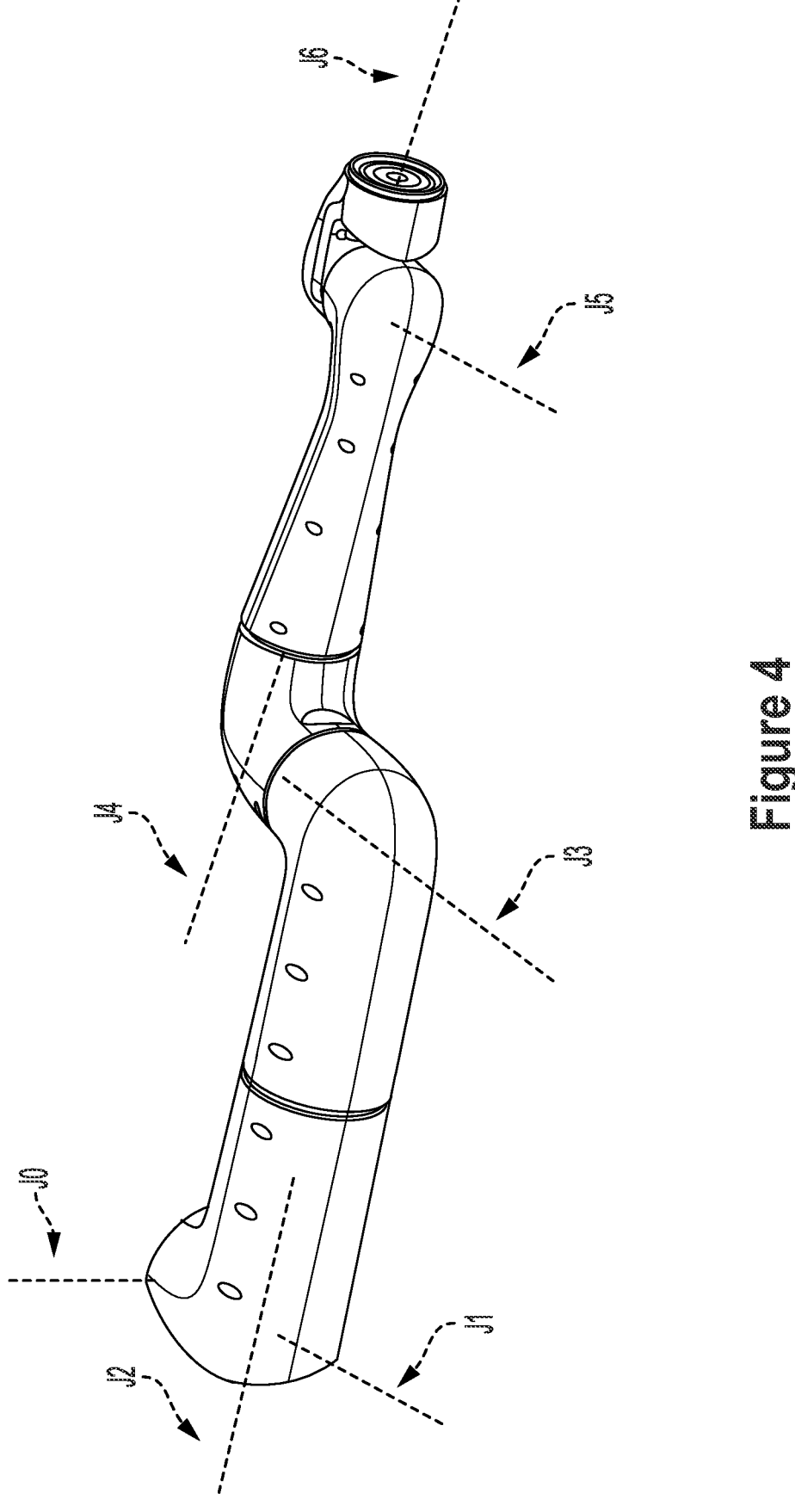
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
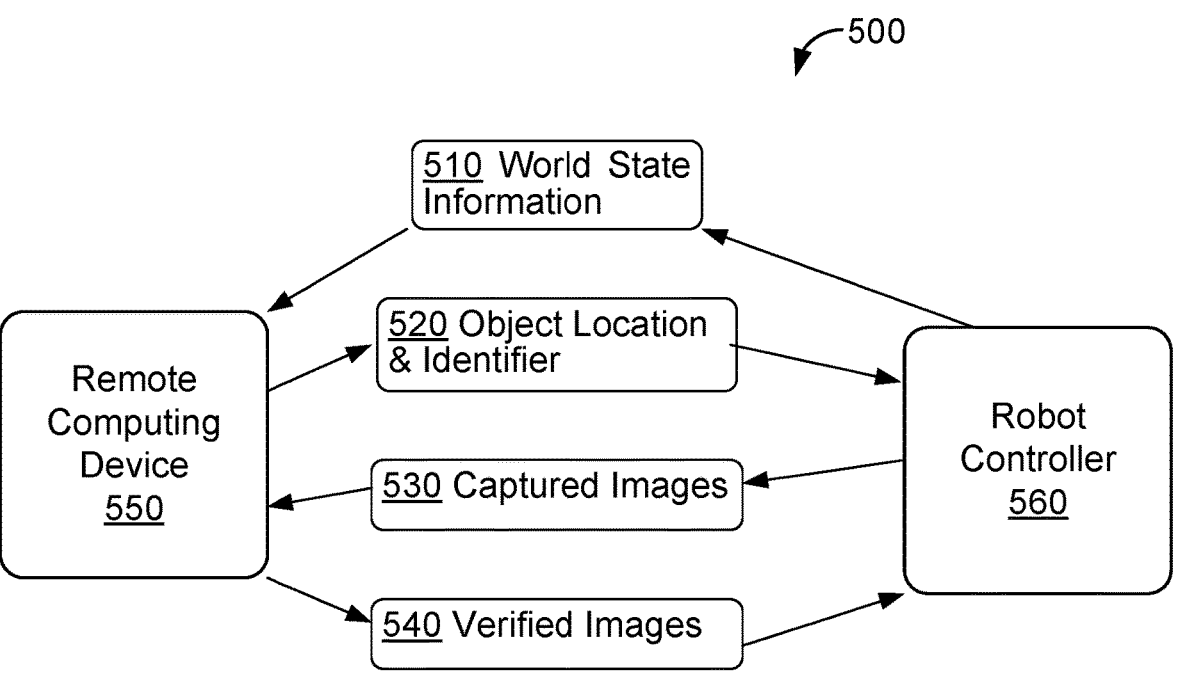
FIG. 5 is an information flow diagram, in accordance with example embodiments.

FIG. 5 is an information flow diagram, in accordance with example embodiments. More specifically, FIG. 5 illustrates an example pipeline 500 that may be utilized by a robot controller, that may be similar to control system 118 of the robotic system 100, and a remote computing device in order to conduct further visual data collection about an object. In some examples, the robotic device may be the robotic device illustrated and described with respect to FIGS. 1-4, with one or more visual sensors and/or one or more grippers mounted on one or more appendages of the robotic device. The pipeline 500 may also be employed by robotic devices with different form factors as well. In further examples, one or more of the blocks may be omitted or combined and/or one or more additional blocks may be added.

Block 560 represents a robot controller of a robotic device. The robot controller represented by block 560 may be similar to control system 118 of the robotic system 100. The robotic device may be in an environment that comprises one or more objects. In some examples, the robotic device may be in an environment that contains at least one unidentified object.

Block 550 represents a computing device that may be remote from a robotic device containing the robot controller represented by block 560. The remote computing device represented by block 550 may have a user interface that a human operator may use to input information. The remote computing device represented by block 550 may be communicatively coupled with the robot controller represented by block 560 via a wireless and/or wired connection.

Block 510 includes world state information determined by the robotic device. The world state information may include location information of objects in the environment in which the robotic device is located. The world state information may further include identification information of objects in the environment. The world state information may further include the pose of the robot and any appendages of the robot. The world state information may also include other types of information about the environment and/or objects in the environment.

Block 520 includes location and identifier data about an object in the environment of the robotic device associated with the robot controller 560. The world state information may be displayed on a user interface of the remote computing device 550. The displayed world state information may include a two-dimensional environment view of the robot recreated from the robot's visual sensors. Both the location and identifier data may be inputted to the remote computing device 550 through the user interface by a human operator. The location data may include a two-dimensional bounding box drawn around the object on the two-dimensional environment view of the robot. As another example, the location data may be a point in three-dimensional space where the object resides in the physical world. The identifier data may be an identifier label that is compatible with an object identification machine learning model of the robot controller 560.

Block 530 includes captured images. The plurality of captured images may be captured by one or more visual sensors of the robotic device associated with the robot controller while the robot controls an appendage to move through a predetermined learning motion path. The robot may be controlled to move the appendage through the predetermined learning motion path responsive to receiving the object location and identification information from the remote computing device as represented by block 520. The object associated with the location and identifier data 520 may be present in some or all of the images. The plurality of captured images may be sent all together to the remote computing device 550. Alternatively, the plurality of captured images may be sent individually as they are captured by the one or more visual sensors to the remote computing device 550.

Block 540 includes one or more verified images. Each image of the plurality of captured images may be verified by a human operator through a user interface of the remote computing device 550 by confirming that the object associated with the location and identifier data 520 is present in the image. The one or more verified images 540 may be sent to the robot controller 560. The one or more verified images 540 may be used to train an object recognition machine learning model of the robot controller 560.

In some embodiments, the data may be communicated between remote computing device 550 and robot controller 560 via a wireless communication connection. In other embodiments, the data may flow between remote computing device 550 and robot controller 560 via a wired communication connection.

Figure 6:
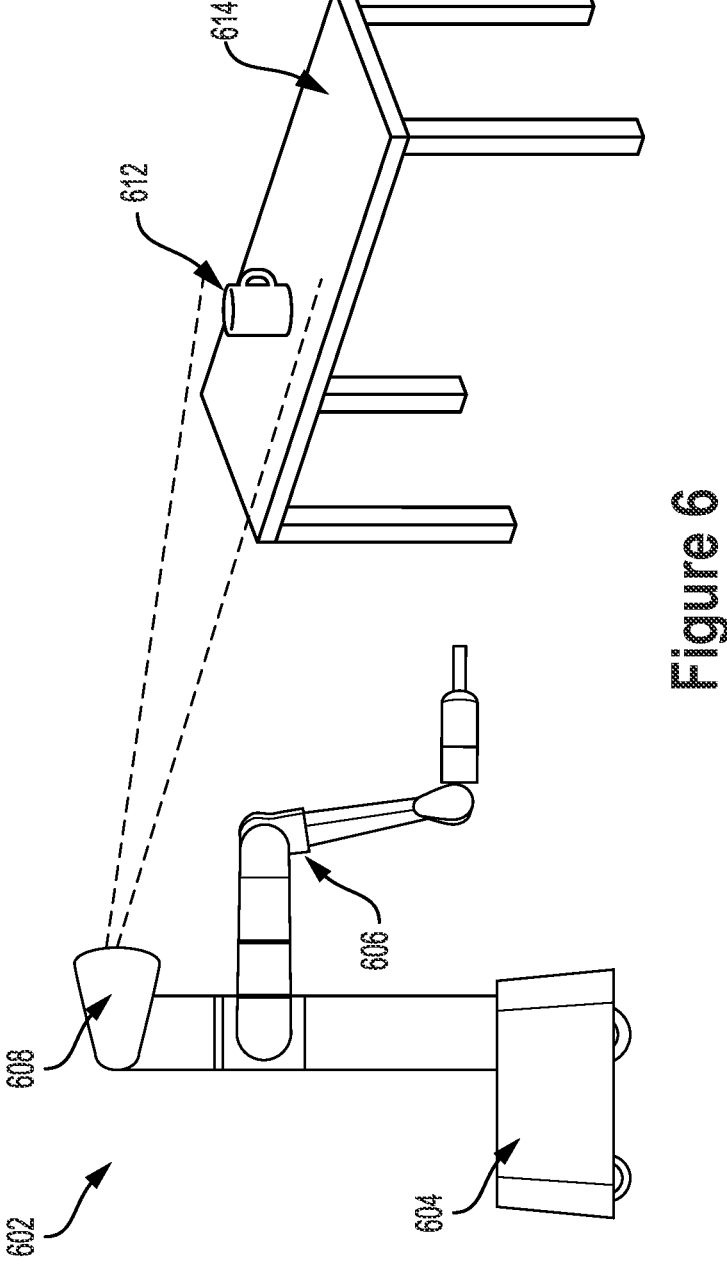
FIG. 6 is a side view of a robot sensing an object, in accordance with example embodiments.

FIG. 6 is a side view of a robot sensing an object with one or more visual sensors, in accordance with example embodiments. More specifically, robot 602 includes a mobile base 604, a robotic arm 606, and a visual sensor 608. The robot 602 may be the same or similar to the robot illustrated and described with respect to FIGS. 1-4, and the robot 602 may include a head-mounted visual sensor 608. Robotic arm 606 may include a gripper that may be the same or similar to the gripper 208 of robot 200. The robot 602 may determine world state information using one or more visual sensors. The world state information may include visual information about one or more objects in the environment of the robot 602, such as objects 612 and 614. The robot 602 may attempt to identify objects such as the objects 612 and 614 in order to understand the geometry and/or other properties of the objects. In some examples, object identification may be performed using a trained machine learning model. The object identification may output an object identification label and a confidence score. The confidence score may be a numeric value that increases the more certain the machine learning model is that the object identification is correct.

In some examples, the robot 602 may be able to detect object 612 with a visual sensor 608. The robot 602 may attempt to identify the object 612 (e.g., as a coffee mug). The object identification results may be sent to a remote computing device for a human operator to review. A human operator may review the object identification results through a user interface to confirm that the identification is correct. In some examples, this identification may be correct, but the confidence score may be low. In other examples, the object identification may fail and a notification may be sent to the remote computing device. In either example, the human operator may review the inaccurate identifications and may trigger a further visual data collection method.

In some examples, the robot 602 may not be able to detect object 612 with a visual sensor 608. A human operator may notice the detection failure through a user interface of a remote computing device. The human operator may then trigger the further visual data collection method. In further examples, the robot 602 may attempt to grab object 612 with the gripper of robot arm 606 and fail because the visual sensor 608 could not detect the edges of the object 612 accurately. The operational failure may trigger an alert to be sent to a human operator for assistance. The human operator may then trigger the further visual data collection method.

Figure 7A:
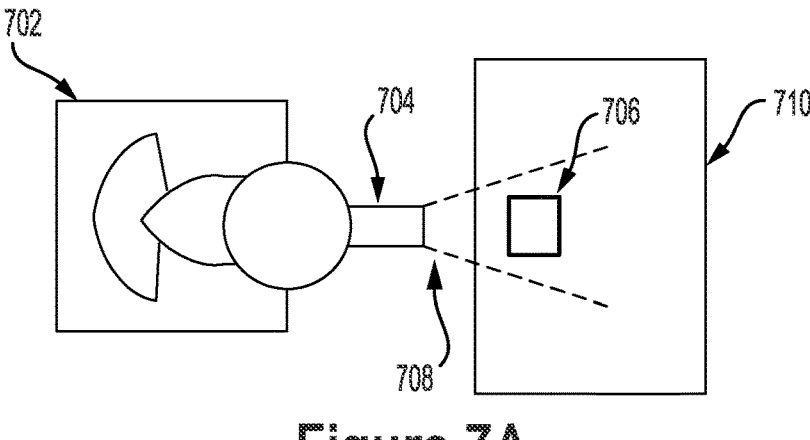
FIG. 7A is a top view of a robot in an initial position, in accordance with example embodiments.
Figure 7B:
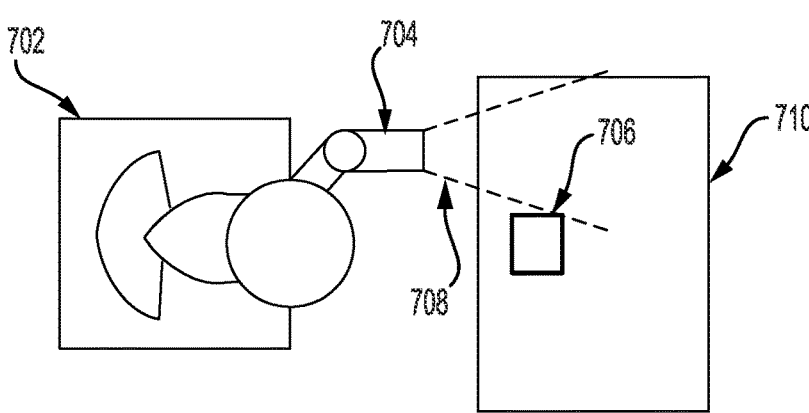
FIG. 7B is a top view of a robot in a final position, in accordance with example embodiments.
Figure 7C:
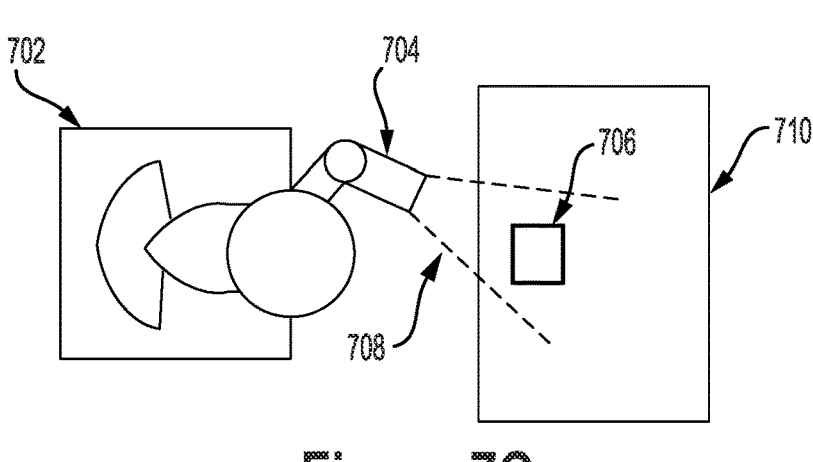
FIG. 7C is a top view of a robot in another final position, in accordance with example embodiments.

FIGS. 7A, 7B, and 7C are top views of a robot in an environment with an object on a surface, in accordance with example embodiments. More specifically, robot 702 has visual sensor 704 with field of view 708 attached to a movable appendage. Object 706 is on a surface 710 in the same environment as robot 702. The robot 702 may be the same or similar to the robot described with respect to FIGS. 1-4.

FIG. 7A depicts possible initial alignments of the robot and the appendage containing a visual sensor, in accordance with example embodiments. More specifically, the object 706 is in the field of view 708 of visual sensor 704 attached to a moveable appendage of the robot 702. In some embodiments, the visual sensor 704 and the robot's control system may be able to detect the object 706 and may attempt to identify it. If the identification fails, the robot control system may send an alert to a remote computing device. A human operator may review the alert on the remote computing device and may send location and identifier data about the object 706 in order to cause the robot 702 to move visual sensor 704 through a predetermined learning motion path while capturing images to collect further visual data. In other embodiments, the visual sensor 704 and the robot's control system may not be able to detect the object 706 despite being in the field of view 708. A human operator may notice the failed detection and may send location and identifier data about the object 706 in order to cause the robot 702 to move visual sensor 704 through predetermined learning motion path while capturing images to collect further visual data.

FIG. 7B depicts possible final alignments of the robot and the appendage containing the visual sensor, in accordance with example embodiments. More specifically, the visual sensor 704 of the robot 702 is positioned such that the object 706 is not in the field of view 708 of the visual sensor 704. In some embodiments, the predetermined learning motion path is not altered while the robot is executing it and the robot will capture images with visual sensor 704 throughout the motion path regardless of whether the object is still in the field of view 708. For example, if the predetermined learning motion path is a spiral starting with the object centered in the field of view 708, the visual sensor 704 may end in a position similar to FIG. 7B.

FIG. 7C depicts alternative possible final alignments of the robot and the appendage containing the visual sensor. More specifically, the visual sensor 704 of the robot 702 is positioned such that the object 706 is in the field of view 708 of the visual sensor 704. In some examples, images captured by the visual sensor 704 may be sent individually as they are captured to a remote computing device. In such examples, one or more images of the plurality of images may be verified by a human operator using a user interface of the remote computing device. The one or more verified images may be sent back to the control system of the robot 702 while the robot 702 is still controlling the visual sensor 704 to move along the predetermined learning motion path. The control system of the robot 702 may use the one or more verified images to detect and/or track the object 706 in real time. The control system may then adjust the movement of the visual sensor 704 in an effort to keep the object 706 in the field of view 708 so that one or more subsequently captured images will contain the object 706. Thus, in some embodiments, at the end of the predetermined learning motion path, the visual sensor 704 may end up in an alignment similar to FIG. 7C.

Figure 8A:
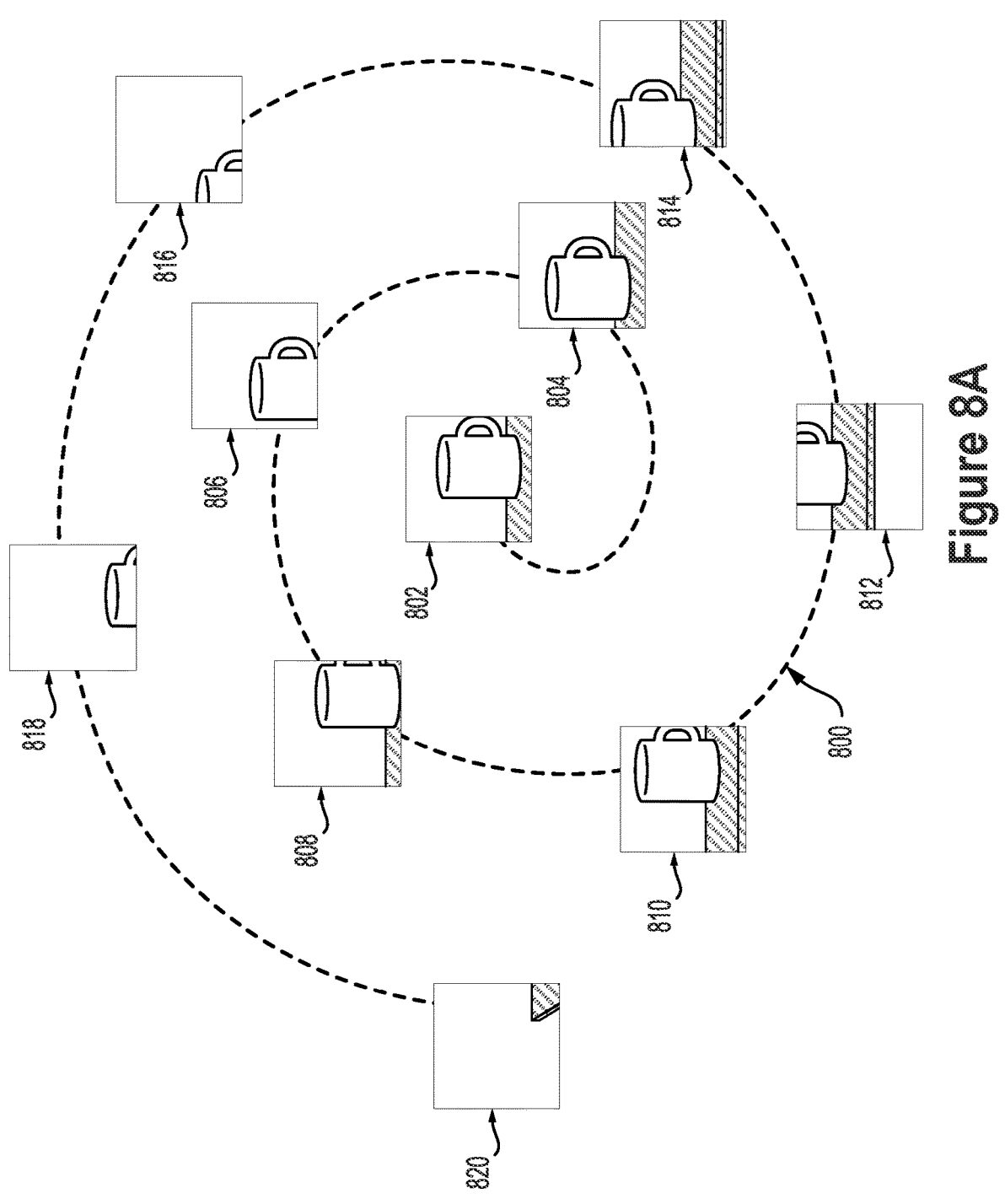
FIG. 8A is a motion path with captured images, in accordance with example embodiments.

FIG. 8A is an example predetermined learning motion path that may be followed by a robot and example visual data of a target object that may be collected, in accordance with example embodiments. In some embodiments, a human operator may trigger a robot to conduct further visual data collection, and the robot may then move at least one appendage along the motion path 800. In some embodiments, the appendage may contain one or more visual sensors to conduct the further visual data collection. In other embodiments, one or more visual sensors may be mounted to the robot and a gripper is attached to the appendage, such that the gripper holds the target object in view of one or more visual sensors while moving along the motion path 800. In some examples, the robot may use a camera to capture images while moving along the motion path 800. In the illustrated example, images 802, 804, 806, 808, 810, 812, 814, 816, 818, and 820 are captured by the camera. Motion path 800 may be programmed to efficiently capture images. For example, the motion path 800 may be programmed such that each image captured contains new visual data in order to avoid capturing identical images. This may be done by programming the motion path 800 to expand outward from the starting point, such as, but not limited to, a spiral path. In examples such as the one illustrated, the predetermined learning motion path does not overlap itself. In some embodiments, the collected images may be sent to a remote computing device to be displayed on a user interface.

Figure 8B:
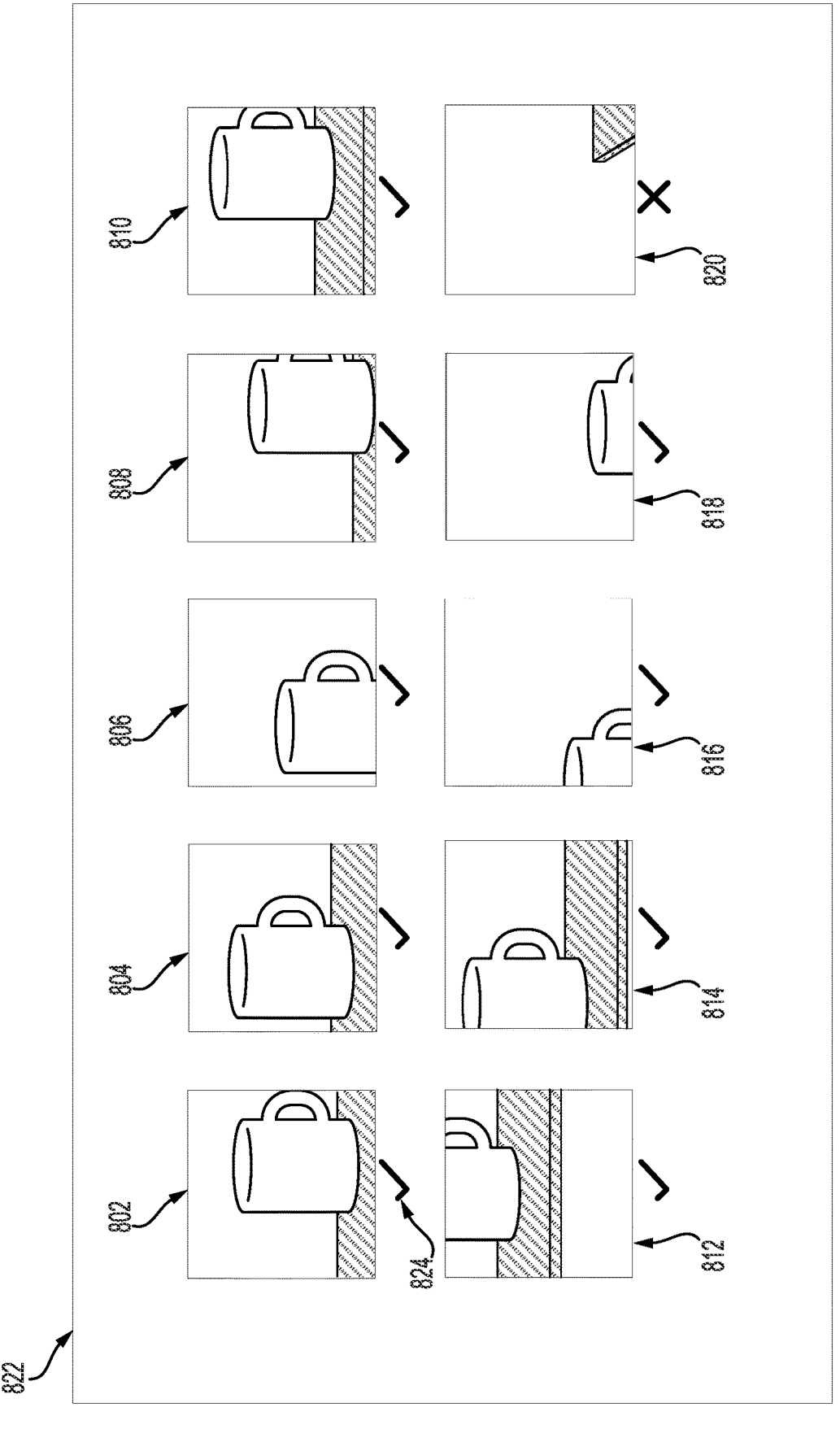
FIG. 8B is a user interface displaying captured images, in accordance with example embodiments.

FIG. 8B depicts an example user interface of a remote computing device that has been sent collected visual data, in accordance with example embodiments. In the illustrated example, a user interface 822 displays the collected images 802, 804, 806, 808, 810, 812, 814, 816, 818, and 820. In further embodiments, a human operator may verify which of the displayed images contain a target object and input a verification value. In some examples, the verification value may be a binary value, which may be inputted in this example user interface as check marks 824. In other examples, the verification value may be a scaled score, where the score increases or decreases based on how much of the object is present in the image.

Figure 9:
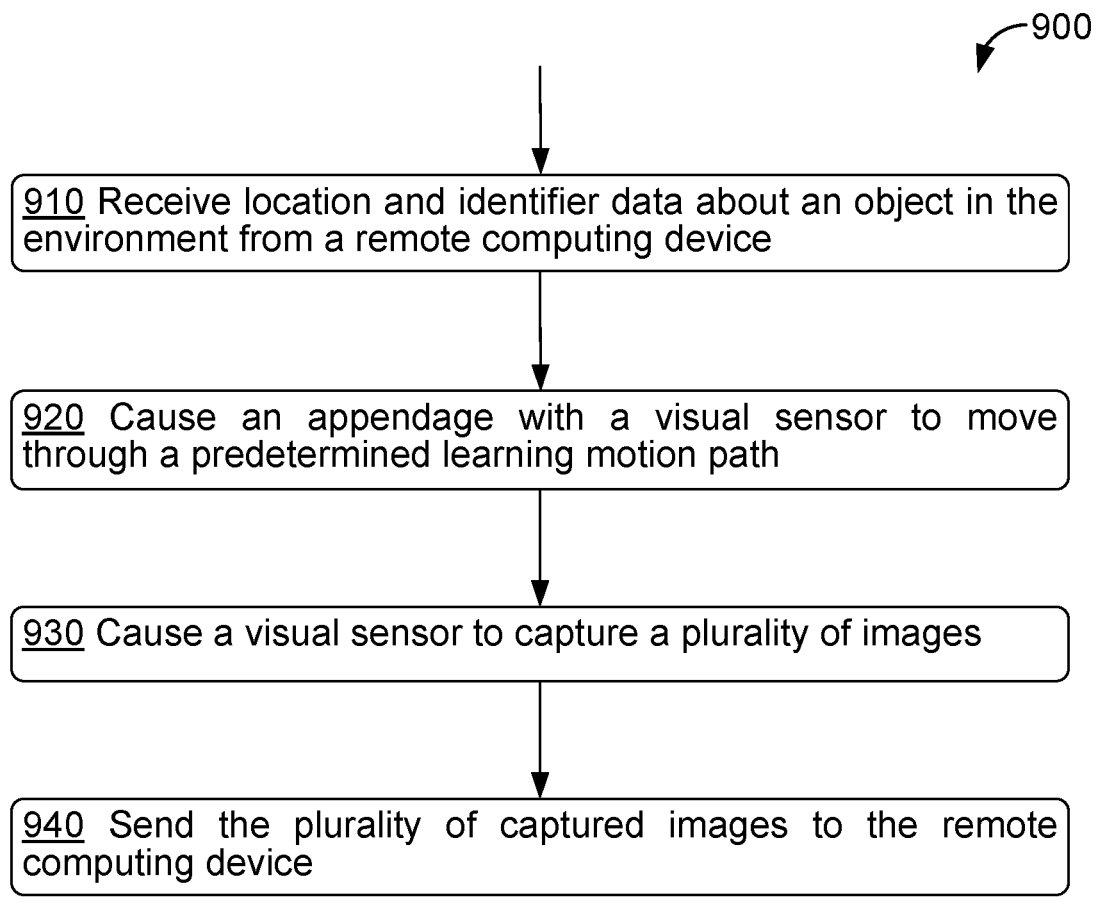
FIG. 9 is a block diagram of a method, in accordance with example embodiments.

FIG. 9 is a block diagram of a method, in accordance with example embodiments. In some examples, method 900 of FIG. 9 may be carried out by a control system, such as control system 118 of robotic system 100. In further examples, method 900 may be carried by one or more processors, such as processor(s) 102, executing program instructions, such as program instructions 106, stored in a data storage, such as data storage 104. Execution of method 900 may involve a robotic device, such as illustrated and described with respect to FIGS. 1-4. Other robotic devices may also be used in the performance of method 900. In further examples, some or all of the blocks of method 900 may be performed by a control system remote from the robotic device. In yet further examples, different blocks of method 900 may be performed by different control systems, located on and/or remote from a robotic device.

At block 910, method 900 includes receiving location and identifier data about an object in the environment from a remote computing device. More specifically, a control system of a robotic device may receive data about an object in an environment, where the data comprises at least location data and identifier data. The data may be sent by a human operator via a user interface of a remote computing device. In some examples, the location data may be a two-dimensional bounding box drawn around the object on a two-dimensional environment view of the robot recreated from the robot's visual sensors. The identifier data may be an identifier label that is compatible with an object identification machine learning model library of the robot's control system.

At block 920, method 900 includes causing an appendage to move through a predetermined learning motion path. More specifically, based on the location data of block 910, a control system of a robotic device may cause at least one appendage of the robotic device to move through a predetermined learning motion path. The at least one appendage may include one or more visual sensors. The at least one appendage may include a gripper. The control system may use the location data of the object as an initial seed to line up an appendage of the robotic device such that the object is in the view of the one or more visual sensors. In some examples, the appendage may comprise one or more visual sensors. In other examples, the appendage may comprise a gripper to hold the object. The robot may control the appendage to move through a predetermined learning motion path. In some examples, the predetermined learning motion path may be a spiral motion path. In further examples, the predetermined learning motion path may be selected from multiple predetermined learning motion paths. The predetermined learning motion paths may vary based on the object's size and shape. Further, the predetermined learning motion paths may vary based on the environment and surroundings of the robotic device. In some embodiments, the robotic device may have more than one appendage and the appendages may be controlled to move along different predetermined learning motion paths.

At block 930, method 900 includes causing a visual sensor to capture a plurality of images. More specifically, while the at least one appendage moves through the predetermined learning motion path, the one or more visual sensors may capture a plurality of images for potential association with the identifier data. Some or all of the plurality of images may contain the object associated with the location data. In some instances, one or more of the plurality of images may not contain the object associated with the location data.

At block 940, method 900 includes sending the plurality of captured images to the remote computing device. More specifically, a robot control system may send the plurality of captured images to be displayed on a display interface of a remote computer device. In some embodiments, the plurality of captured images may be sent from the robot control system to a remote computing device once the predetermined learning motion path has been completed. In other embodiments, each of the plurality of captured images may be sent individually as each one is collected.

In some examples, the object may remain stationary throughout the performance of method 900 while at least one appendage comprising one or more visual sensors is moved through a predetermined learning motion path. In further examples, the one or more visual sensors may remain fixed on the robot throughout the performance of method 900 while the at least one appendage moves the object through a predetermined learning motion path with a gripper. In yet further examples, the performance of method 900 may involve alternating between one or more stages where only the one or more visual sensors are moved while the object remains fixed and one or more stages where only the object is moved while the one or more visual sensors remain fixed. In other examples, both the object and the visual sensors may be moved simultaneously by separate appendages in synchronization during the performance of method 900.

In further embodiments, the robotic device may initially attempt to identify the object with one or more visual sensors before receiving the location and identification data. In some embodiments, the robotic device may have incorrectly identified the object. In other embodiments, the robotic device may not have detected the object accurately.

In further embodiments, one or more of the plurality of collected images may be verified on the remote computing device as containing the object associated with the location data. In some embodiments, the one or more verified images may be received by the robot control system after all images in the plurality of collected images have gone through a verification process. In other embodiments, the one or more verified images may be received by the robot control system individually as each of the plurality of collected images are verified through a verification process.

In further examples, the robot control system may receive the verified images before the predetermined learning motion path is completed and may use the verified images in a training a machine learning model to identify and/or detect the object and may adjust the predetermined learning motion path to cause subsequently captured image to contain the object. In further examples, the robot control system may adjust the predetermined learning motion path to cause a subsequently captured image to contain the object in the center of a frame of one or more visual sensors.

In further embodiments, one or more verified images may be used to train a machine learning model to identify the object. In further examples, an appendage of the robot may be controlled to move through an additional motion path based on the trained machine learning model while capturing one or more additional images with the one or more visual sensors. In yet further examples, the additional one or more images may also be verified to contain the object. The additional one or more verified images may then be used to train an object recognition machine learning model of the robotic device for future object recognition.

In further embodiments, the one or more verified images may be used to train an object recognition machine learning model of the robotic device for future object recognition by the robotic device and the robot control system using the one or more visual sensors. In even further embodiments, the one or more verified images may be used to train object recognition machine learning models that are used by other robotic devices and robot control systems.

Figure 10:
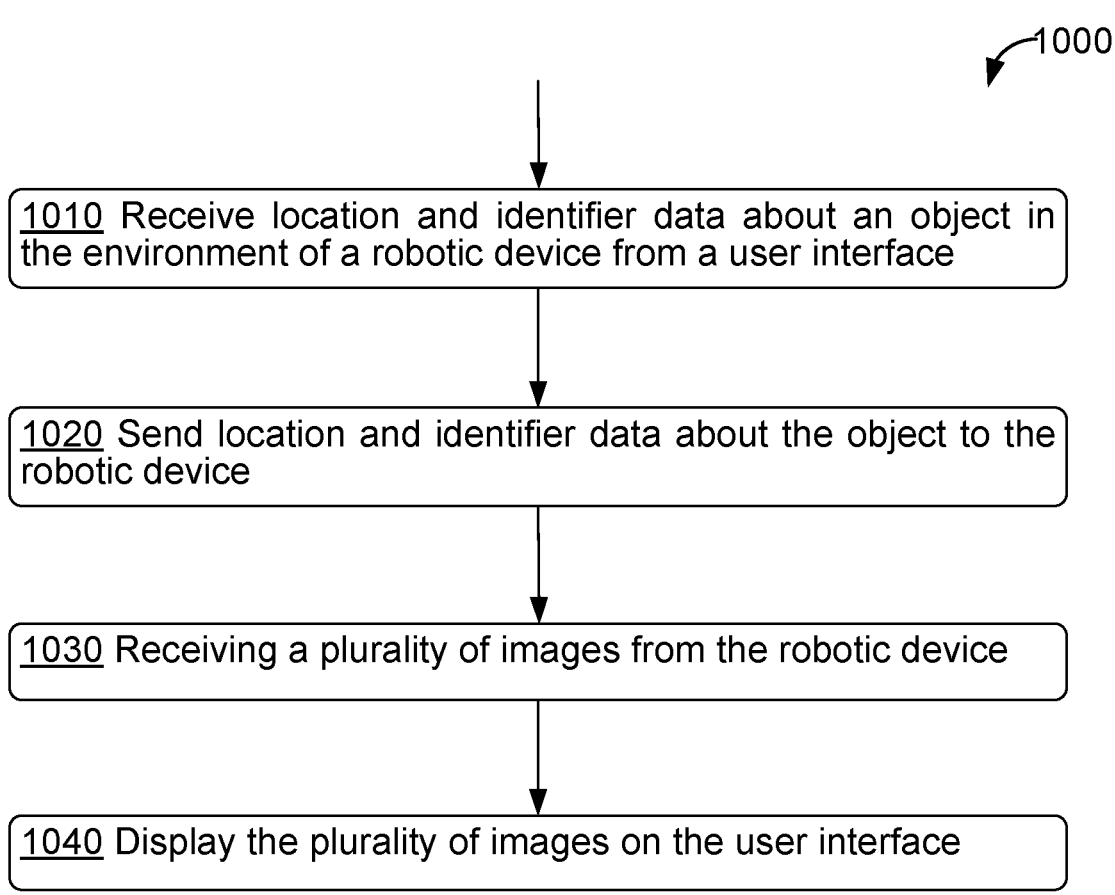
FIG. 10 is a block diagram of another method, in accordance with example embodiments.

FIG. 10 is a block diagram of a method, in accordance with example embodiments. In some examples, method 1000 of FIG. 10 may be carried out by a computing device that is remote from a robot. In further examples, method 1000 may be carried by one or more processors executing program instructions stored in a data storage. Execution of method 900 may involve communication with a robotic device, such as illustrated and described with respect to FIGS. 1-4. Other robotic devices may also be used in the performance of method 1000. In further examples, different blocks of method 1000 may be performed by different control systems, located on and/or remote from a robotic device.

At block 1010, method 1000 includes receiving location and identifier data about an object in the environment of a robotic device from a user interface. More specifically, a remote computing device may receive, from a user interface, data about an object in an environment of a robotic device, where the data comprises at least location data and identifier data. The data may be inputted by a human operator via a user interface of the remote computing device. In some embodiments, the location data may be a two-dimensional bounding box drawn around the object on a two-dimensional environment view of the robotic device recreated from the robotic device's visual sensors. In some embodiments, the identifier data may be an identifier label that is compatible with an object identification machine learning model library of the robotic device's control system.

At block 1020, method 1000 includes sending location and identifier data about the object to the robotic device. More specifically, the location and identifier data may be sent from the remote computing device to the robotic device to cause at least one appendage of the robotic device to move through a predetermined learning motion path while capturing images. In some embodiments, the data may be sent over a wireless communication connection. In other embodiments, the data may be sent over a wired communication connection.

At block 1030, method 1000 includes receiving a plurality of images from the robotic device. More specifically, after sending the data to the robotic device, the remote computing device may receive a plurality of images captured by the robotic device. In some embodiments, the plurality of images may be captured by one or more visual sensors of the robotic device that moved through a predetermined learning motion path. In some examples, each of the images of the plurality of images may be received individually as each is collected by the one or more visual sensors. In some examples, the plurality of images may be received all at once.

At block 1040, method 1000 includes displaying the plurality of images on the user interface. In some embodiments, the plurality of images may be displayed on the remote computing device once they have been received. In some examples, the plurality of images may be received individually and may be displayed one at a time. In other examples, the plurality of images may be displayed all at once.

In further embodiments, the user interface of the remote computing device may provide functionality that allows a human operator to review displayed images and verify if they contain the object associated with the location data. More specifically, method 1000 may include verifying, based on user input received from the user interface, one or more of the plurality of captured images, where the object is present in the one or more verified images. In some examples, the verification may be a binary value indicating where either at least some portion of the object is present in the image or no portion of the object is present in the image. In other examples, the verification may include a scaled score, where the score increases or decreases based on how much of the object is present in the image. In some examples, the plurality of images may be displayed individually as they are received and the human operator may verify them individually as they are displayed. In some examples, the plurality of images may be verified while the robotic device is moving in a predetermined learning motion path. In some examples, the human operator may confirm the association between the identifier data and the one or more verified images.

In further embodiments, one or more verified images may be sent to the robotic device. In some examples, the one or more verified images may be sent to the robotic device all at once. In other examples, the one or more verified images may be sent to the robotic individually. In further examples, the one or more verified images may be sent to the robotic device before the robotic device has completed a predetermined learning motion path. In some examples, the robotic device may use the verified images to train one or more machine learning models for future object recognition. In some examples, the verified images may be used to train one or more machine learning models used by other robotic devices as well or instead.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, by a control system of a robotic device, data about an object in an environment, wherein the data comprises at least location data and identifier data;

based on the location data, causing at least one appendage of the robotic device to move the object through a predetermined learning motion path, wherein the predetermined learning motion path is configured to facilitate training of an object identification model of the control system of the robot device;

while the at least one appendage of the robotic device moves the object through the predetermined learning motion path, causing one or more visual sensors on the robotic device to capture a plurality of images when the object is positioned at different points along the predetermined learning motion path for potential association with the identifier data; and providing one or more of the plurality of captured images to train the object identification model to identify the object.

2. The method of claim 1, further comprising:

initially attempting to identify the object in the environment with the one or more visual sensors without moving the at least one appendage, wherein causing the at least one appendage of the robotic device to move the object through the predetermined learning motion path is performed in response to inadequate initial identification of the object.

3. The method of claim 1, wherein the location data comprises a two-dimensional (2D) bounding box.

4. The method of claim 1, wherein the predetermined learning motion path starts at a position in which the one or more visual sensors are expected to initially center the object in an image frame.

5. The method of claim 1, wherein the predetermined learning motion path is a spiral motion path.

6. The method of claim 1, wherein the predetermined learning motion path is selected from a plurality of motion paths that vary based on dimensions of the object.

7. The method of claim 1, wherein the plurality of captured images are sent together to the remote computing device when the predetermined learning motion path has been completed.

8. The method of claim 1, wherein the plurality of captured images are sent one at a time to the remote computing device as they are captured with the one or more visual sensors.

9. The method of claim 1, further comprising receiving one or more verified images of the plurality of captured images from the remote computing device, wherein the one or more verified images are verified as containing the object.

10. The method of claim 9, wherein the one or more verified images are received before completion of the predetermined learning motion path, wherein once the one or more verified images are received, the method further comprises:

using the one or more verified images, training a machine learning model to identify and detect the object; and adjusting the predetermined learning motion path to cause subsequently captured images to contain the object.

11. The method of claim 10, wherein predetermined learning motion path is adjusted to cause a next image captured to contain the object in a center of a frame.

12. The method of claim 9, wherein after the one or more verified images are received, the method further comprises:

using the one or more verified images to train a machine learning model to identify the object;

causing the at least one appendage to move the object through an additional motion path based on the trained machine learning model while capturing one or more additional images with the one or more visual sensors; and verifying that the additional one or more images contain the object.

13. The method of claim 9, wherein the one or more verified images are used for future object recognition by the robotic device using the one or more visual sensors.

14. The method of claim 1, wherein the predetermined learning motion path expands outward from a starting position.

15. The method of claim 1, wherein the predetermined learning motion path does not overlap itself.

16. A method comprising:

receiving data about an object in an environment of a robotic device, wherein the data comprises at least location data and identifier data;

sending the data to the robotic device to cause at least one appendage of the robotic device to move the object through a predetermined learning motion path while capturing images with one or more visual sensors of the robotic device when the object is positioned at different points along the predetermined learning motion path, wherein the predetermined learning motion path is configured to facilitate training of an object identification model of the of the robotic device;

providing, by the robotic device, one or more of the captured images to train the object identification model.

17. The method of claim 16, wherein identifier data of the object is one of a plurality of predefined identifiers.

18. The method of claim 16, further comprising:

verifying, based on user input received from the user interface, one or more of the plurality of captured images, wherein the object is present in the one or more verified images; and sending the one or more verified images to the robotic device.

19. A robotic device, comprising:

at least one appendage;

one or more visual sensors; and a control system configured to:

receive data about an object in an environment, wherein the data comprises at least location data and identifier data;

based on the location data, cause at least one appendage of the robotic device to move the object through a predetermined learning motion path relative to the object, wherein the predetermined learning motion path is configured to facilitate training of an object identification model of the control system of the robot device;

while the at least one appendage moves the object through the predetermined learning motion path, cause one or more visual sensors on the robotic device to capture a plurality of images while the object is positioned at different points along the predetermined learning motion path for potential association with the identifier data; and provide one or more of the plurality of captured images to train the object identification model to identify the object.

20. The robotic device of claim 19, wherein the predetermined learning motion path is a spiral motion path.

* * * * *